United States Patent [19]

Golden

[11] Patent Number: 4,868,824

[45] Date of Patent: Sep. 19, 1989

[54] MEASUREMENT OF MISSED START-UP RATE AND MISSED MESSAGE RATE

[75] Inventor: Glenn D. Golden, Tinton Falls, N.J.

[73] Assignees: American Telephone and Telegraph Company, New York, N.Y.; AT&T Information Systems Inc., Morristown, N.J.

[21] Appl. No.: 137,995

[22] Filed: Dec. 28, 1987

[51] Int. Cl.⁴ .............................................. G06F 11/00
[52] U.S. Cl. ........................................ 371/53; 371/66; 371/20.4
[58] Field of Search .................... 371/5, 8, 22, 53, 57, 371/32, 33, 66; 375/10, 8, 11; 364/200, 900

[56] References Cited

U.S. PATENT DOCUMENTS

| | | | |
|---|---|---|---|
| 4,238,779 | 12/1980 | Dickinson | 371/5 |
| 4,351,059 | 9/1982 | Gregoirè | 371/22 |
| 4,385,384 | 5/1983 | Rosbury | 371/8 |
| 4,390,989 | 6/1983 | Pahrson | 371/53 |
| 4,617,662 | 10/1986 | Auer | 371/53 |
| 4,710,929 | 12/1987 | Kelly | 371/22 |

Primary Examiner—Michael R. Fleming
Attorney, Agent, or Firm—Ronald D. Slusky

[57] ABSTRACT

In a voiceband data multipoint network, each tributary modem transmits, in a trailer which follows the user data, a tributary modem identification, a sequence number which advances for each start-up and a checksum. The observation at the receiver of a gap in the series of sequence numbers in messages determined to have originated from a particular tributary modem is used to accurately compute a missed message rate for that modem.

22 Claims, 6 Drawing Sheets

MEASUREMENT OF MISSED START-UP RATE AND MISSED MESSAGE RATE

BACKGROUND OF THE INVENTION

The present invention relates to data communications and, more particularly, to techniques for measuring the performance of data communications systems.

A useful diagnostic parameter in such data communications systems as multipoint voiceband data networks is the so-called "missed start-up rate". This is the rate at which the central modem is unable—due to channel noise, gain or phase hits, etc.—to determine its start-up parameters (such as the receiver gain setting, the baud sampling phase and the carrier phase angle) with sufficient accuracy to enable error-free recovery of the subsequent data. A straightforward way of measuring this parameter is to have each tributary modem transmit ahead of the user-supplied data (hereinafter "user data") a header which includes (a) an address or other tributary-identifying indicium and (b) some mechanism for verifying the correctness of that address at the receiver, such as a checksum. If the checksum fails, a missed start-up is declared to have occurred.

A problem with this approach, however, is that if the checksum has failed, indicating that the header contains one or more errors, then the control modem cannot be assured that the tributary modem address contained in the header is correct. Thus although the control modem is able to determine that a missed start-up occurred, it will not be able to positively identify the particular tributary modem involved. As a practical matter, then, accurate measurement of the missed start-up rate on a per-tributary-modem basis is not possible.

One way of providing a per-tributary-modem measurement of this parameter is to infer it via an observation of the dispersion of the signal points in the constellation of signal points received from each tributary modem. This approach is disadvantageous, however, in that the relationship between such dispersion and the actual missed start-up rate is approximate at best. A further disadvantage is that it requires significant real time signal processing capability.

SUMMARY OF THE INVENTION

The present invention is directed to a technique which overcomes the above-discussed disadvantages. In accordance with the invention, each modem whose missed start-up rate is to be measured transmits along with its address or other identification, a sequence number which advances for each N start-ups, where N is some convenient number. Assuming that the tributary identity can be correctly decoded at least some of the time—even when the signal, as received, is quite degraded—the observation at the receiver of a gap in the series of sequence numbers received from a particular tributary modem can be used to accurately compute the missed start-up rate for that modem.

In accordance with a feature of the invention, it has been realized that since the missed start-up rate is only a measure of whether the header was able to be successfully communicated, it is a less-than-ideal measure of overall communications integrity. Specifically, it is always possible for transmission errors to occur in the user data after an error-free start-up. Since the computed value of the missed start-up rate will not reflect such error events, it gives a somewhat more optimistic measure of communications quality than actually exists.

Advantageously, however, it has been realized that if the checksum is computed not only over the tributary address and sequence number but also over the user data, one is able to generate a parameter which affords a measure more precise than the missed start-up rate of the quality of the communications from the tributary modem. This parameter, hereinafter referred to as the "missed message rate", is a measure of the frequency with which one or more errors occur anywhere in the message, not just the header. In preferred embodiments which implement this approach, the tributary address and sequence number are contained not in a header but rather, along with the checksum, in a trailer which follows the user data. Advantageously, using a trailer rather than a header to convey the non-user data—an approach which is taught in my co-pending U.S. patent application entitled "Data Transmission with Improved Message Format", Ser. No. 07/137966, Dec. 28, 1987 filed of even date herewith—facilitates the transmission of the tributary address and sequence number while—in contradistinction to the use of a header—not adding to the so-called RS-CS delay at the tributary modem.

BRIEF DESCRIPTION OF THE DRAWING

In the drawing,

FIGS. 5 and 6, when arranged with FIG. 5 above

FIGS. 7 and 8, when arranged with FIG. 7 above

DETAILED DESCRIPTION

Figure 1:
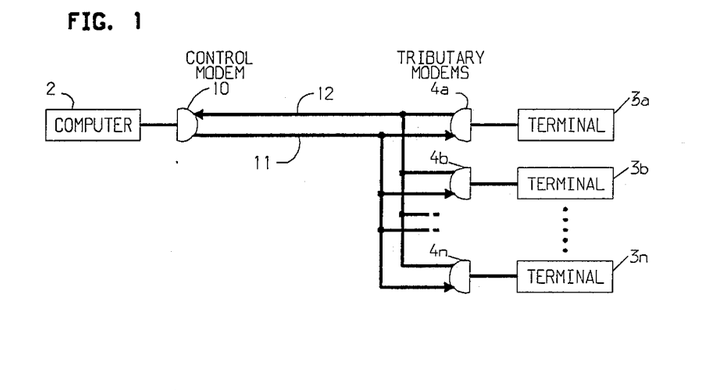
FIG. 1 shows a multipoint voiceband data communications system in which the present invention is illustratively implemented.

FIG. 1 depicts a multipoint voiceband data communications system, or network, in which the present invention is used. In particular, a computer 2 communicates on a time-shared basis with a plurality of data terminals $3a$, $3b$, ..., $3n$. A control modem 10 is associated with computer 2. Tributary modems $4a$, $4b$, ..., $4n$ are associated with terminals $3a$, $3b$, ..., $3n$, respectively. The system communicates data on a full-duplex basis. Thus, computer 2 transmits information to the various terminals on a broadcast basis via modem 10, the outbound path 11 of a four-wire multipoint private voiceband telephone line, and the various modems $4a$, $4b$, ..., $4n$. An individual one of the terminals $3a$, $3b$, ..., $3n$ transmits information to computer 2 via its associated modem, the inbound path 12 of the multipoint private voiceband telephone line, and modem 10.

Modems $4a$, $4b$, ..., $4n$ and 10 provide several functions. One is to modulate the data to be communicated into, and to demodulate it out of, the passband of paths 11 and 12. Another is to correct for distortion and other channel irregularities which may cause, for example, intersymbol interference.

In carrying out the latter function, the modems of FIG. 1 use so-called "receive" equalization for so-called "outbound" communications from control modem 10 to the tributary modems 4a, 4b, . . . ,4n over path 11. Here, the receiver portion of each tributary modem includes an adaptive equalizer through which the received line signal is passed. The equalizer is realized in the form of a transversal filter, whose so-called "tap" coefficients are adapted to the characteristics of the channel in question, thereby enabling the equalizer to remove most of the channel-induced distortion.

Receive equalization is also typically used in multipoint networks for communications in the other, "inbound", direction. (As will be discussed shortly, however, tributary-to-control communications in the network of FIG. 1 is carried out using so-called "transmit" equalization.) Although generally satisfactory, receive equalization engenders a significant RS-CS delay at the tributary modems, that delay being the time between when the terminal associated with a particular tributary modem raises its request-to-send (RS) lead—indicating that it wishes to transmit a message to computer 2—and the time that the modem responds by raising its clear-to-send (CS) lead—indicating that the tributary modem is ready to transmit that data. The source of receive equalization's relatively large RS-CS delay is the fact that before transmission of data from a particular tributary modem can begin, a set of coefficients appropriate for communications with that tributary modem must be provided in the control modem receiver equalizer, and a certain amount of time is required to do this.

For example, during the RS-CS interval the tributary modem may send to the control modem a training data sequence—thereby enabling the control modem to "relearn" the channel for each transmission—prior to the transmission of user data. The RS-CS delay is thus at least as large as the time required to transmit the training sequence. Alternatively, the control modem may store the coefficients, once learned, for the channel from each tributary and then, when an inbound message arrives, load the appropriate coefficient set into the equalizer. Although this stored coefficient approach obviates the need to wait for the equalizer to re-learn the channel, it nonetheless engenders a not-insignificant RS-CS delay as well, because the tributary modem must identify itself to the control modem in order for the latter to load in the proper set of coefficients. Since the channel will not have been equalized at that point in time, the tributary modem must transmit its identity at a relatively slow data rate so that it can be recovered at the control modem without equalization.

(One possible receive equalization approach that does not engender any significant RS-CS delay relies on the fact that in virtually all multipoint applications, the data terminal or other data processing equipment associated with the tributary modems does not attempt to transmit inbound messages to the computer or other equipment associated with the control modem unless the latter polls it. It is thus possible to have the control modem monitor the outgoing polls at the computer/modem interface and determine the identity of the polled tributary from the address contained in each poll. Armed with this knowledge, the control modem could immediately retrieve the appropriate set of previously learned coefficients and, again, load them into the equalizer without having to receive a low-speed address from the tributary modem. A drawback of this approach, however, is the fact that it necessitates customization of the modem to take account of the particular data transmission protocol being used by the data processing equipment.)

In order to minimize the RS-CS delay, then, the system of FIG. 1 uses so-called transmit equalization such as that described in U.S. Pat. No. 4,489,416 issued Dec. 18, 1984 to R. L. Stuart. As with receive equalization, transmit equalization initially entails the provision of an adaptive equalizer in the receiver portion of the control modem. However, once the set of coefficients that will equalize the channel from a particular tributary modem—say modem 4a—to the control modem 10 has been determined in modem 10, the values of those coefficients are communicated to modem 4a. Modem 4a, in turn, thereafter uses the coefficients to predistort its transmitted line signal, in a sense anticipating the distortion that will be introduced by the channel. The signal received from modem 4a by modem 10 is thus relatively distortion-free.

Figure 2:
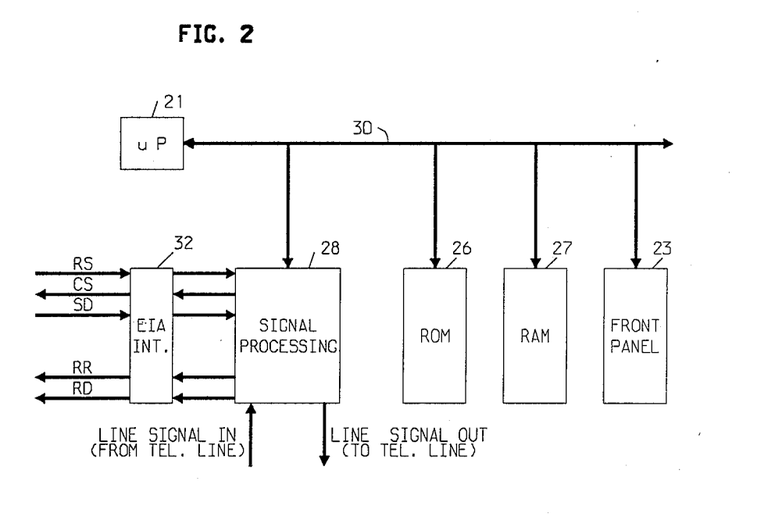
FIG. 2 is a block diagram showing the architecture of the modems used in the system of FIG. 1.

Modems 4a, 4b, . . . ,4n and 10 illustratively share a common architecture, which architecture is shown in FIG. 2. In particular, each modem operates under the control of a microprocessor 21 which communicates with a number of peripheral devices via a system of address, data and control leads indicated generically at 30. The peripheral devices include front panel circuitry 23, ROM 26, and RAM 27 and signal processing module 28. The latter performs the real-time functions of, for example, (a) coding and modulation of user data, the latter being supplied to the modem on the send data (SD) lead of RS-232 interface 32 and being delivered by the modem to the multipoint private line, and (b) decoding and demodulation of line signals presented to the modem from the multipoint private line, the recovered data thereupon being presented to the user on the received data (RD) lead. Signal processing module 28 further performs the aforementioned transmit and receive equalization functions. Among the other leads extending to and from interface 32 are the aforementioned RS and CS leads and a receiver ready (RR) lead which, when active, indicates the presence of valid received data on the RD lead. Module 28 is illustratively realized as an ensemble of appropriately programmed digital signal processing chips.

Figure 3:
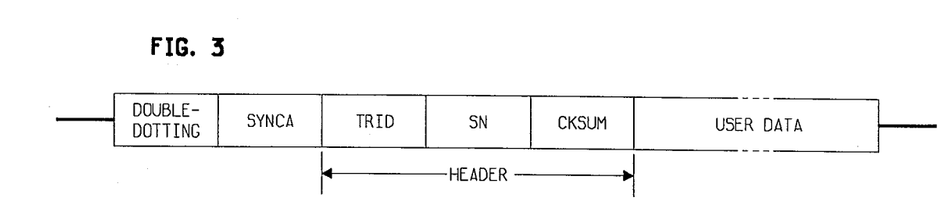
FIG. 3 shows a first message format that can be used to implement the invention.

FIG. 3 shows the format of a message communicated from one of tributary modems 4a, 4b, . . . ,4n of FIG. 1 to control modem 10. This format is used once the control data set receive equalizer has been trained and the resulting coefficient values have been communicated to the tributary modem as described above. In particular, the message includes a start-up sequence comprised of a predetermined interval of a "double-dotting" signal of the form A,A,−A,−A, . . . , where A is a predetermined two-dimensional quadrature amplitude modulated (QAM) signal point which illustratively is not a member of the symbol alphabet that will be used to convey the user data. The function of the double-dotting signal is to allow the receiver in the control modem to acquire certain signal parameters necessary to ensure proper demodulation of the following data symbols, such parameters including, for example, the receiver gain setting, the baud sampling phase and the carrier phase angle. This start-up sequence is followed by a predetermined synchronization signal, SYNCA, which illustratively consists of the sequence A,A,A, transmitted after a −A,−A of the start-up sequence. The function of SYNCA is to delimit the end of the start-up sequence and the beginning of a header sequence, also referred to herein simply as a header.

The header sequence is comprised of three pieces of information: a tributary indentification TRID, a sequence character SN and a an error-checking code work—illustratively a checksum CKSUM. Tributary indentification TRID uniquely identifies the particular transmitting tributary modem. (Since the system of FIG. 1 uses transmit equalization, TRID is not needed for purposes of equalizer coefficient loading, as described above. However, it facilitates measurement of the missed start-up rate as described in further detail hereinbelow.) Character SN is one of a sequence of characters, with successive characters of the sequence being provided in successive messages transmitted by the tributary modem in question. The sequence could be, for example, a sequence of alphabetic characters such as A,B,C, . . . or A,A,A,B,B,B,C,C,C, . . . In this embodiment, however, the sequence is comprised of a sequence of numbers which the tributary modem increments by unity for each N transmissions therefrom. Illustratively, N=1. Checksum CKSUM is a checksum computed over TRID and SN and is used in the control modem as information enabling the control modem to determine that it has correctly recovered TRID and SN.

The message format of FIG. 3 facilitates the measurement, in accordance with the invention, of the missed start-up rate. In particular, assuming that the tributary modem address can be correctly recovered at least some of the time—even when the signal is quite degraded—the observation at the control modem receiver of a gap in the series of sequence numbers received from a particular tributary modem can be used to accurately compute the missed start-up rate for that tributary modem, as will be described in further detail hereinbelow in conjunction with the flowchart of FIGS. 5-6.

Figure 4:
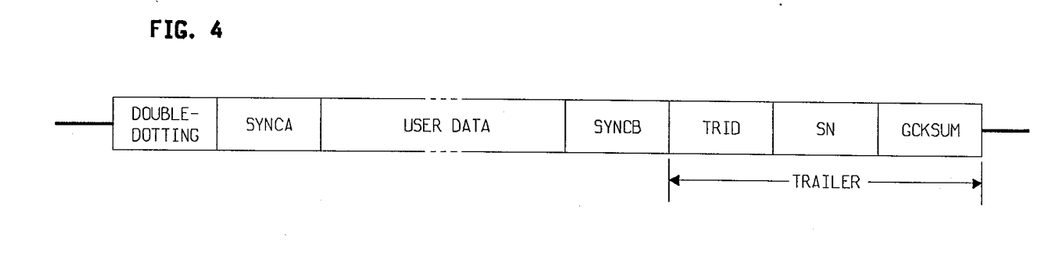
FIG. 4 shows a second message format that is preferably used to implement the invention.

FIG. 4 shows an alternative message format that allows for determination of an even more accurate measure of modem performance referred to herein as the "missed message rate". With this format, in particular, the checksum appears at the end of the message and is a "global" checksum in that it is computed not only over the tributary address and sequence number but also over the user data as well. The missed message rate thus more closely reflects what the user really wants to know, viz., how many messages, not just headers, were not received error-free.

In particular, the message format of FIG. 4 includes a start-up sequence again comprised of a predetermined interval of a "double-dotting" signal, followed by synchronization signal, SYNCA, the user data, and a second synchronization signal SYNCB. The latter delimits the end of user data and must be a signal which has a very small probability of being interpreted as user data. Illustratively, SYNCB is a sequence of QAM signal points which are not used to represent user data. (The signal points comprising SYNCB may be different from the aforementioned signal points "A" and "−A".)

SYNCB is followed by a trailer sequence which contains not only a global checksum, as mentioned above, but also information similar to that contained in the header of the FIG. 3 message format. As also previously mentioned, the global checksum, here denominated GCKSUM, is computed over all of the user data and TRID and SN. (SYNCB is excluded from the checksum because this eliminates a possible source of complexity in maintaining a correct checksum in the face of transmission errors which may cause a symbol carrying user data to be erroneously interpreted as one of the signal points which comprise SYNCB.) Since GCKSUM is provided subsequent to the user data, it is information enabling the control modem to determine that not only TRID and SN were correctly recovered, but that the user data was correctly recovered as well.

There are at least two advantages to providing this modem-to-modem data in a trailer rather than in a header.

Firstly, the tributary modem RS-CS delay can be made significantly shorter than if such information were to be conveyed in a header. This is, of course, a consequence of the fact that the header precedes the user data and thus the modem cannot begin to transmit the latter until it has transmitted the former. Providing the information in a trailer, however, advantageously eliminates this source of delay because placing the modem-to-modem data following the user data allows certain time delays inherent in th operation of multipoint polling networks to be exploited.

Assume, for example, that computer 2 is currently receiving a message from terminal 3a via their respective associated modems. Upon receipt of SYNCB of that message, control modem 10 makes lead RR inactive. Computer 2, upon observing this or other indicium of the end of user data from terminal 3a, can begin to poll another terminal, say terminal 3b, even though the trailer of the message from terminal 3a is still being received. The still incoming trailer and the new outgoing poll to terminal 3b thus overlap in time. (They do not collide, however, because the control and tributary modems communicate over full-duplex channels.)

Moreover, it may appear that the trailer from modem 4a could potentially collide with the start-up sequence from modem 4b, since the terminal associated with the latter is being polled while the trailer from modem 4a is still arriving. Indeed, if terminal 4b raised its RS lead while the trailer from 4a were still being transmitted, a collision would, in fact, occur. However, there are sources of delay associated with the transmission of each polling sequence, for example, propagation delay through the transmitter of control modem 10 and the receiver of tributary modem 4b. These delays engender a minimum time interval between the time the last bit of a poll sequence is supplied by computer 2 to control modem 10, and the time that same bit appears at the RD lead of modem 4b, the latter time being the earliest possible time that terminal 3b could raise its RS lead in response to the poll, thus causing modem 4b to initiate a start-up sequence. In practice, this minimum time interval is considerably longer than the time necessary to transmit SYNCB and the trailer, and so the hypothetical collision does not occur.

In summary, then, placing the modem-to-modem information in a trailer, rather than in a header, exploits these inherent delays, allowing the time used in transmitting modem-to-modem data to overlap in time with outbound polling sequences.

A second advantage in this particular application to having the modem-to-modem data in a trailer is that since GCKSUM is provided subsequent to the user data and can thus be taken over that data as well as TRID and SN, the control modem is able to determine that not only TRID and SN were correctly recovered, but that the user data was correctly recovered as well. As discussed in the above-mentioned co-pending U.S. patent application, this, in turn, allows the control modem to keep an accurate measure of a tributary modem performance parameter referred to herein as the "missed message rate". This parameter indicates the percentage of entire messages which were not received error-free. (With the format of FIG. 3, by contrast, the control modem would only be able to measure the so-called missed start-up rate, this being an indication only of how many headers were not received error-free.)

Figure 5:
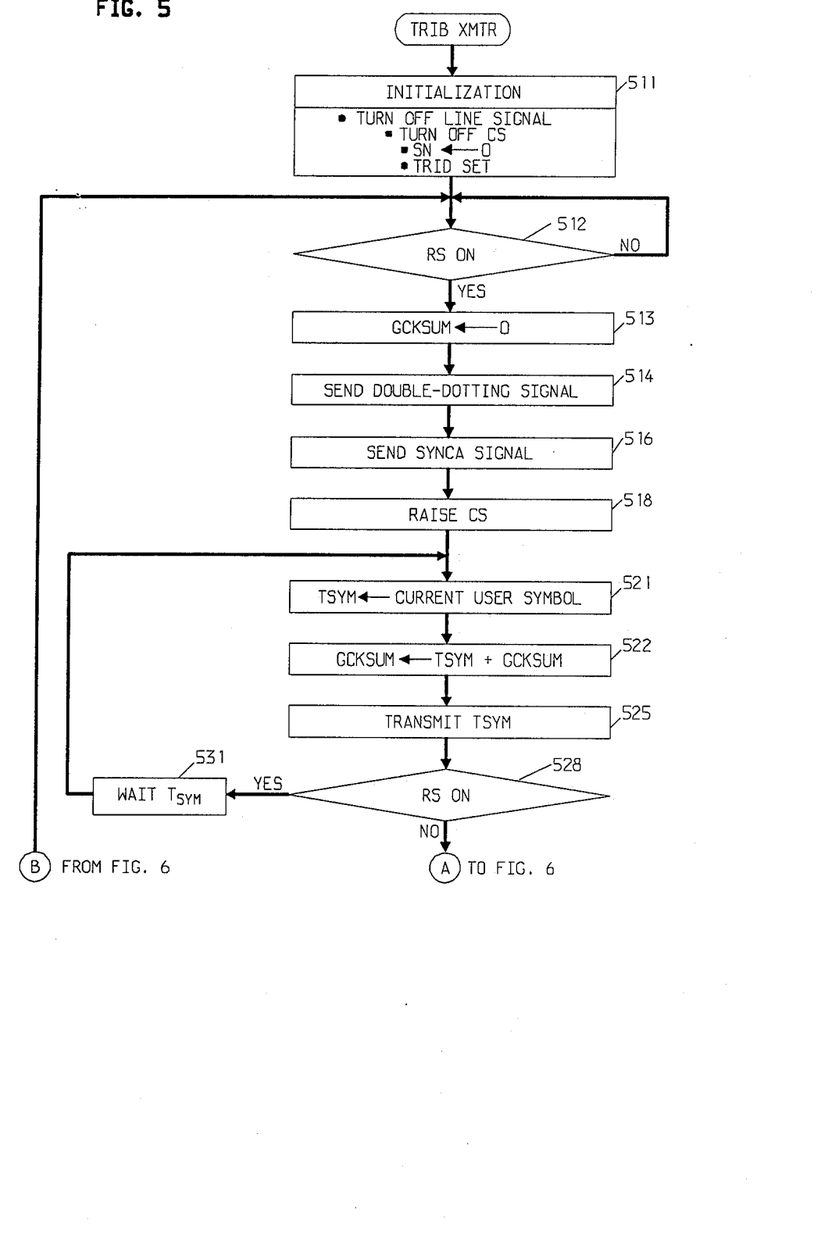
Figure 6:
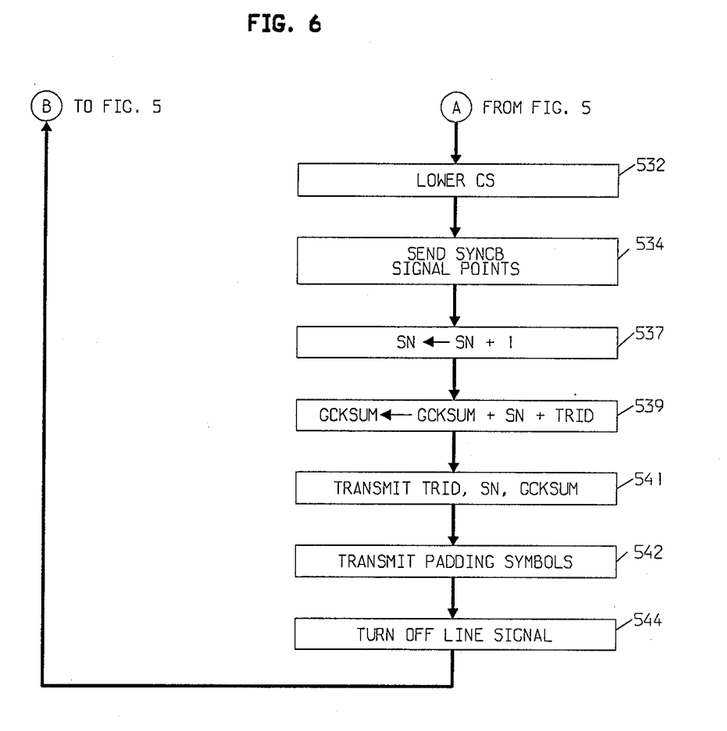
FIG. 6, show a flowchart of operations performed in a tributary modem in the system of FIG. 1 in furtherance of implementing the invention.

The flowchart of FIGS. 5–6 depicts the operations performed in an individual one of tributary modems 3a, 3b, . . . , 3n in creating a message of the type shown in FIG. 4. Depending on the particular implementation, any of the various steps of the flowchart may be performed within microprocessor 21, signal processing module 28 or some combination, as desired. (The modem performs many other functions which, because they do not relate to the message creation function, are not shown in the FIGS.)

When the modem is, for example, first turned on, it performs a number of initialization functions, as indicated at 511. These functions include turning off its line signal, i.e., the signal on path 12, turning off, or lowering, its CS lead, initializing to zero the k-bit sequence number variable SN and interrogating front panel circuitry 23 to determine tributary identification TRID. (The notation SN ← 0 within block 511 and elsewhere in the FIGS. means "assign the value 0 to SN".)

At this point, control passes to block 512, from which it exits when lead RS extending from EIA interface 32 is turned on, or raised, by the associated data terminal. Once this occurs, the modem initializes to zero a p-bit checksum variable GCKSUM at block 513, and then transmits double-dotting and SYNCA, as indicated at 514 and 516, respectively. The modem is now ready to transmit user data so it raises its CS lead, as indicated at 518. It then enters a loop during which the user data is transmitted.

In particular, as indicated at 521, the modem generates a binary word TSYM identifying which particular symbol in the predetermined data symbol constellation is to be next transmitted. The value of TSYM is arrived at by performing such tasks as taking in a predetermined number of user-supplied data bits from leas SD, scrambling and differential and/or convolutional coding. The value GCKSUM, which is illustratively a simple additive checksum, is thereupon updated at block 522 by simply adding to it, modulo $2^p$, the value of TSYM. The value of TSYM is then mapped into a particular channel symbol, which is thereupon transmitted, as indicated at 525. As long as it is determined at block 528 that the RS lead is still active, the modem waits at block 531 for a period equal t the symbol interval $T_{SYM}$, and then returns to block 521 to process further user data.

Once it has been determined that the RS lead has been lowered, the modem lowers the CS lead and transmits SYNCB, as indicated at 532 and 534, respectively. As previously mentioned, SYNCB is comprised of a sequence of QAM signal points which are not used to represent user data. The QAM coordinate values of the SYNCB signal points are stored as an array in ROM 26, where they are denoted SYNCB[1], SYNCB[2], . . . , SYNCB[m]. SN is then incremented at block 537.

Continuing at block 539, the value of GCKSUM is updated by adding to it, modulo $2^p$ the values of SN and TRID. The stream of bits formed by concatenating TRID, SN and GCKSUM is thereupon divided into blocks which are then mapped into M individual channel symbols, illustratively without scrambling, differential encoding or other such processing. (If convenient in a particular implementation, such processing could, alternatively, be performed.) As indicated at 541 and 542, those channel symbols are thereupon transmitted, followed, in conventional fashion by a stream of padding symbols (not shown in FIGS. 3 and 4), whose presence ensures that the so-called post-cursors of the previously transmitted symbols are not terminated prematurely.

Finally, as indicated at 544, the modem again turns off its line signal and control returns to block 512.

Figure 7:
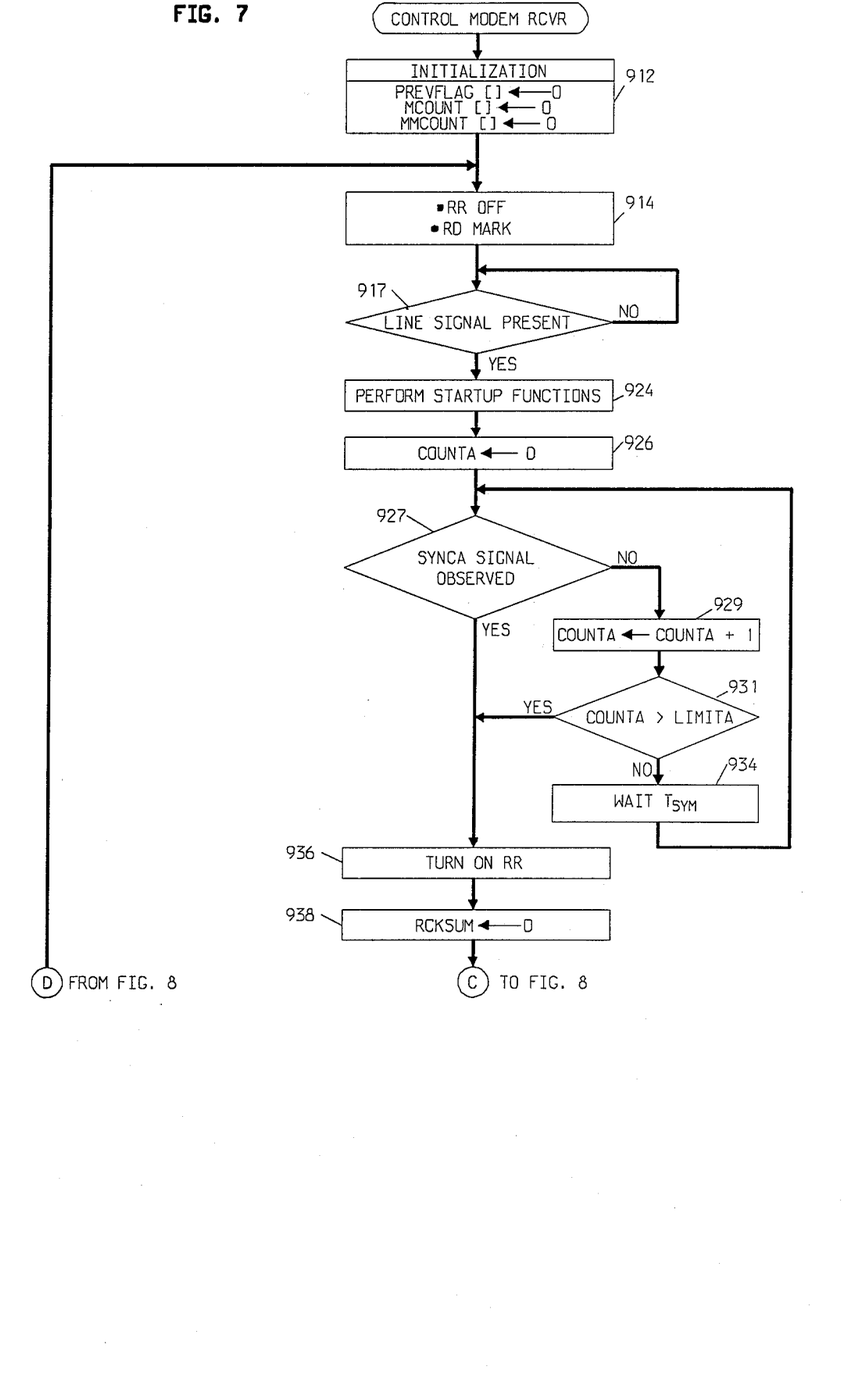
Figure 8:
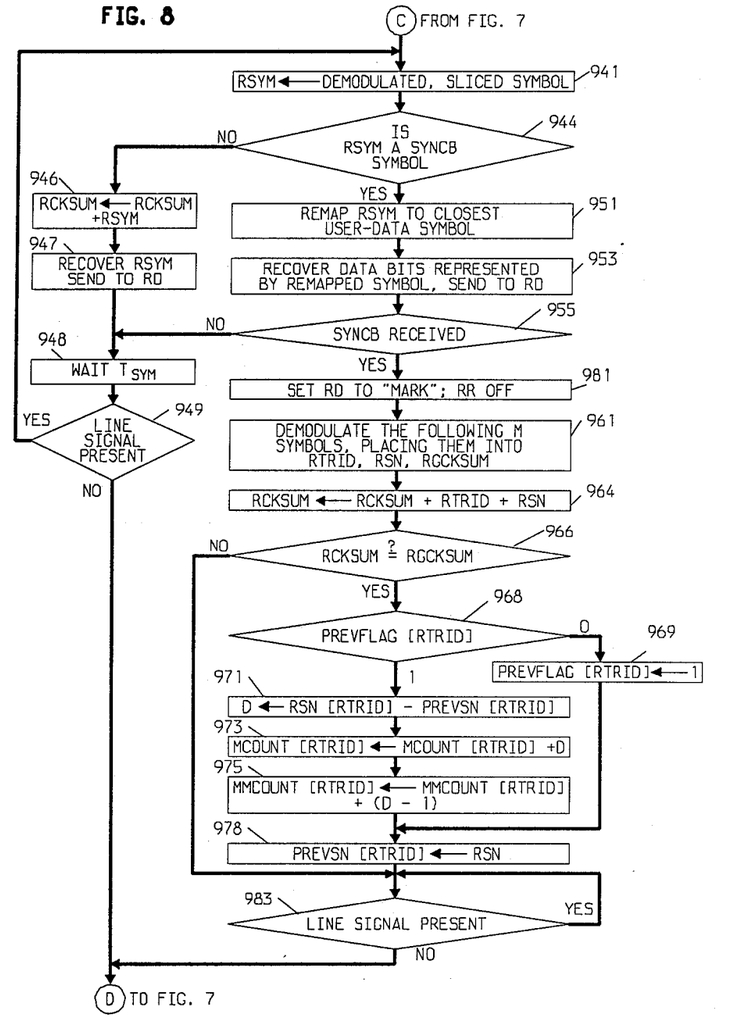
FIG. 8, show a flowchart of operations performed in the control modem in the system of FIG. 1 in furtherance of implementing the invention.

The flowchart of FIGS. 7–8 depicts the operation performed in a control modem 10 in processing a message of the type shown in FIG. 4 received from a particular tributary modem. Again, depending on the particular implementation, any of the various steps of the flowchart may be performed within microprocessor 21, signal processing module 28 or some combination, as desired. (And also again, it will be appreciated that the modem performs many other functions which, because they do not relate to the message processing function, are not shown in the FIGS.)

As indicated at 912, the modem begins by initializing to zero three arrays, PREVFLAG[ ], MCOUNT[ ] and MMCOUNT[ ] whose use will be explained in the sequel. The modem thereupon "arms" itself for a startup by performing a number of actions at block 914. These include lowering the RR lead and setting the RD lead to the "mark", or idle, state. Control then passes to block 917 from which it exist when line signal energy is detected. Acting on the assumption that this initial portion of the line signal is a double-dotting signal, the modem proceeds to perform a number of start-up functions, as indicated at block 924. These functions principally comprise the acquisition of the aforementioned signal parameters such as receiver gain setting, baud sampling phase and carrier phase angle. At a predetermined time after line signal energy is detected, it is presumed that these parameters have been determined with sufficient accuracy to allow for the accurate demodulation of what follows, beginning with any remaining double-dotting signal points and SYNCA.

In order to detect the presence of SYNCA, the modem begins, as indicated at 926 by initializing a variable COUNTA to zero. It is thereupon determined at 927 whether SYNCA has, in fact, arrived. It does this by examining the most recently demodulated signal point and determining whether it, in combination with the four previously demodulated signal points, comprises the sequence $-A, -A, A, A, A$. If it does, SYNCA has arrived and control passes to block 936, at which point lead RR is raised, indicating to computer 2 the start of user data. If, on the other hand, SYNCA has not yet arrived, the variable COUNTA is incremented at 929 and its value is then tested at 931. If it is found that COUNTA now exceeds a predetermined limit LIMITA—whose value is chosen taking into account the predefined length of the double-dotting signal—it is assumed that, as the result of noise or other channel disturbances, SYNCA has been missed and that user data has begun. It is likely that the initial part of the subsequent block of user data has already passed. Control nonetheless passes to block 936. The (higher-level) data communications protocol being used by computer 2 and terminals 3a, 3b, . . . , 3n will detect the corrupted block and deal with the situation by, for example, requesting a retransmission. Finally, if COUNTA is less than LIMITA, the modem waits at block 934 for a period equal to $T_{SYM}$ and then returns to block 927.

Following block 936, a variable RCKSUM is initialized to zero at block 938, this variable holding the value of the checksum of the received symbols as accumulated up to any particular point in time. The first received signal point is then sliced at block 941 using an "expanded" signal constellation which includes not only the alphabet of allowable user-data-bearing data symbols but also the aforementioned symbols which make up SYNCB. The sliced signal point, RSYM, is then examined at block 944 to determined whether it is one of those SYNCB symbols. If it is not, control passes to block 946 at which the value of RCKSUM is updated by the value of RSYM. The data bits represented by RSYM are thereupon recovered at block 947—the processing at that block encompassing such steps as equalization, demodulation, differential and/or trellis decoding, and descrambling—and the recovered bits are delivered to the user on lead RD. The modem then waits a period equal to $T_{SYM}$ at block 948. As long as line signal is still present, as determined at block 949, processing returns to block 941.

Returning, now to block 944, if, contrary to the previous assumption, it is determined that RSYM is a SYNCB symbol, processing proceeds at block 951. Here we take into account the fact that we may, in fact, not actually be in the process of receiving SYNCB but, rather, have received a user-data-bearing symbol which was, for example, corrupted in in channel and now appears as a SYNCB symbol. In order to minimize the effects of such corruption in the recovered data delivered to the user, the modem identifies the symbol in the transmitted constellation closest to RSYM and, as will be seen, proceeds to deliver to the user the data that the "remapped" symbol represents. If it turns out that the transmitted symbol was, in fact, user-originated, so much the better. If, on the other hand, a SYNCB symbol was actually transmitted, there is no real harm done in having remapped it because in typical data communications arrangements, computer 2 will have already recognized the end of the user data block and will ignore the data represented by the remapped symbol.

At block 953, the remapped symbol is thereupon processed as at block 947 to recover the user data bits. Processing then proceeds at block 955 at which it is determined whether the unmapped received symbol in combination with the symbols received immediately before it comprise SYNCB. If they do not, processing proceeds to block 948 as aforesaid. Otherwise, it is assumed that SYNCB has arrived and, at block 981, RD is set to "mark", lead RR is lowered and trailer processing proceeds.

Specifically, the trailer is illustratively carried by M data symbols, as previously mentioned, which are processed at block 961 to recover the bits in the trailer. These bits are thereupon grouped into words corresponding to TRID, SN and GCKSUM. Inasmuch as the values of these words are recovered may, through, for example, channel disturbances, be different from their values as transmitted, they are here denominated RTRID, RSM and RGCKSUM, respectively.

The running checksum RCKSUM that was being updated at block 946 during the receipt of user data is now further updated at block 964 to include the values of RTRID and RSN. If the message was received error-free, then RCKSUM should be equal to RGCKSUM. Indeed, the values of these two variables are now compared at block 966.

If RCKSUM and RGCKSUM are not equal, then one or more errors occurred during the transmission of user data, SYNCB, TRID, SN or GCKSUM. The modem thereupon enters block 983, from which it exits and returns to block 914 when line signal is no longer present.

If, on the other hand RCKSUM and RGCKSUM are equal, then the message is assumed to have been recovered error-free. Thus the values of RTRID and RSN are assumed valid and we can proceed to perform missed message rate processing.

In carrying out that processing, control modem 10 maintains the aforementioned three arrays PREVFLAG[ ], MCOUNT[ ] and MMCOUNT[ ] as well as a fourth array PREVSN[ ], with the $i^{th}$ element of each array being associated with the $i^{th}$ one of tributary modems 4a, 4b, . . . ,4n. In particular, PREVFLAG[i] has the value "0" if no error-free message has yet been received from the $i^{th}$ tributary modem and "1" otherwise; MCOUNT[i] contains the total number of messages received from the $i^{th}$ tributary modem, that number being inferred from the missed message processing about to be described; MMCOUNT[i] contains the number of missed messages from the $i^{th}$ tributary modem, that number again being inferred from the missed message processing; and PREVSN[i] is the value of the sequence number RSN contained in the last error-free message received from the $i^{th}$ tributary modem.

Beginning at block 968, the value of PREVFLAG[RTRID] is checked. If it is "0", indicating that this is the first error-free message received from the tributary modem identified by RTRID, there is, in general, no basis for knowing whether any previous messages from that tributary modem were missed. At this time, then, the modem simply sets PREVFLAG[RTRID] to "1" and records the current value of RSN in PREVSN[RTRID] at blocks 969 and 978, respectively, and then proceeds to block 983 to await the loss of line signal at the end of the current message.

If, on the other hand, the value of PREVFLAG[RTRID] is "1", indicating that a previous error-free message was received from the tributary modem identified by RTRID, processing proceeds to block 971. Here the difference between RSN[RTRID] and PREVSN[RTRID], denoted D, is computed (taking into account the wraparound of RSN[RTRID], which can only take on $2^k$ different values). Since the sequence numbers transmitted from a particular tributary modem illustratively advance by unity for each successive transmitted message, the value of D represents the number of messages that were transmitted—including the current message—since the last error-free message was received from that tributary modem. In addition, the quantity (D−1) represents the number of intervening non-error-free messages which have occurred since the last error-free message was received. For example, assume RSN from the $RTRID^{th}$ tributary modem is 12 and PREVSN[RTRID] is 8. Thus, D=4, from which we learn that (a) the currently received message is the $4^{th}$ one transmitted by the $RTRID^{th}$ tributary modem since control modem 10 last received an error-free message from that particular modem and (b) the three intervening messages contained one or more errors, i.e., the size of the aforementioned "gap" is 3.

In view of the foregoing, the modem thus proceeds to update the values of MCOUNT[RTRID] and MMCOUNT[RTRID] by adding D to the former at block 973 and the quantity (D−1) to the latter at block 975. Processing then proceeds to blocks 978 and 983 as before.

Given the values of MMCOUNT[RTRID] and MCOUNT[RTRID], control modem 10 is thus able to report the current value of the missed message rate of the RTRID$^{th}$ tributary to the user on demand (such as in response to a request entered via the modem front panel), that rate being, of course, the ratio of MMCOUNT[RTRID] to MCOUNT[RTRID].

The foregoing is merely illustrative of the principles of the invention. For example, although in the present embodiment the sequence numbers advance by unity for each transmitted message, they could be advanced at any other convenient numerical increment. Indeed, the series of sequence numbers need not be regular in any way but, rather, could comprise a series of numbers or characters known at both the tributary and control modems.

In addition, although in the present illustrative embodiment the sequence number is advanced for each transmission from a particular tributary modem, it is possible to advance it only for every N transmissions, where N is some convenient integer. At the receiver, then, the number of messages that were missed between two successive error-free received messages would be inferred from the number of instances of a particular sequence number that did not appear at the receiver. This approach ameliorates a particular problem, namely, that the modulo-$2^k$ arithmetic used to compute D, as described above, can result in computed values for MCOUNT and MMCOUNT which are both incorrect by a multiple of $2^k$. This can occur if more than $2^k$ errored messages in a row arrive from a particular tributary, as the transmitted sequence numbers will then "wrap around", their sequence thus becoming indistinguishable from the sequence occurring $2^k$ messages previously. The probability of this event can be made arbitrarily small by increasing the value of k, but at the expense of increasing the number of bits, and thus the number of symbols, required to represent the SN field in the trailer of FIG. 4. However, if the sequence number is advanced every N transmissions instead of every one, then, at the receiver, the number of messages that were missed between two successive error-free received messages would be inferred from the number of instances of a particular sequence number that did not appear at the receiver. In this manner, N times as many messages can be transmitted before the sequence numbers wrap around, thus reducing the likelihood of occurrence of the problem. On the other hand, this approach introduces a minor delay of N/2 messages, on average, before being able to perform an accurate missed message rate calculation, because the modem must wait for RSN to change value before MCOUNT[RTRID] and MMCOUNT[RTRID] can be updated.

In embodiments such as those described in the previous two paragraphs, the aforementioned "gap" would simply constitute whatever part of the sequence is missing, it being known, a priori, at the control modem what the transmitted sequence is. And the "size" of the gap, then, would then be the count of elements that are missing.

Furthermore, although in the disclosed embodiment the information which enables the control modem to determined that TRID and SN were correctly recovered is a simple additive checksum, a different type of error checking code word could be used instead.

It will thus be appreciated that those skilled in the art will be able to devise numerous arrangements which, although not explicitly shown or described herein, embody the principles of the invention and are thus within its spirit and scope.

What is claimed is:

1. A modem for use as a tributary modem in a multipoint data communications network, said network further including at least a first control modem, said tributary modem comprising
    means for creating messages to be communicated to said control modem, each said message including (a) an identification of said tributary modem and (b) a sequence character that is advanced for every N messages transmitted by said tributary modem, N being a predetermined number, and
    means for communicating said messages to said control modem.

2. The invention of claim 1 wherein said sequence character is a sequence number that is advanced by a predetermined numerical increment for said every N messages.

3. The invention of claim 2 wherein each of said messages includes user date supplied to said tributary modem and wherein said identification and said sequence number are transmitted in said each messages subsequent to said user data.

4. The invention of claim 3 wherein said message creating means further includes in each message information enabling said control modem to determine that at least said identification and said sequence number were correctly recovered by said control modem.

5. The invention of claim 2 wherein said message creating means further provides in each message information enabling said control modem to determine that at least said identification and said sequence number were correctly recovered by said control modem.

6. The invention of claim 5 wherein said information is a checksum.

7. A modem for use as a control modem in a multipoint data communications network, said network further including a plurality of tributary modems, each of said tributary modems being adapted to transmit messages to said control modem, each said message including (a) an identification of said each tributary modem and (b) a sequence character that is advanced for every N messages transmitted by said each tributary modem, N being a predetermined number, said control modem including
    means for receiving said messages, and
    counting means for increasing a count associated with a particular one of said tributary modems whenever a gap occurs in the values of the sequence characters that are in successive messages determined to have originated from that particular modem.

8. The invention of claim 7 wherein said sequence character is a sequence number that is advanced by a predetermined numerical increment for said every N messages.

9. The invention of claim 7 wherein said count is increased as a function of the size of said gap.

10. The invention of claim 9 wherein each said message further includes information enabling said control modem to determine that at least said identification and said sequence number were correctly recovered by said control modem and wherein said counting means determines that a particular message originated from said particular tributary modem only if at least the identification and sequence number in that message were correctly recovered by said control modem.

11. The invention of claim 10 wherein said sequence character is a sequence number that is advanced by a predetermined numerical increment for said every N messages.

12. A method for use in a data communications system in which a plurality of tributary modems transmit messages to a control modem, said method comprising the step performed in each of said tributary modems of
transmitting in each said message to said control modem (a) an identification of said each tributary modem and (b) a sequence character that is advanced for every N messages transmitted by said each tributary modem, N being a predetermined number.

13. The invention of claim 12 wherein said each tributary modem transmits in each message information enabling said control modem to determine that at least said identification and said sequence character were correctly recovered by said control modem.

14. The invention of claim 13 comprising the further steps performed in said control modem of
determining from said information contained in a particular received message whether at least said tributary modem identification and said sequence character were recovered correctly, said particular message being determined to have originated from a particular one of said tributary modems modem only if said tributary modem identification and said sequence character were recovered correctly, and
increasing a count associated with said particular modem whenever a gap occurs in the values of the sequence characters that are in successive messages determined to have originated from that particular modem.

15. The invention of claim 14 wherein in said count increasing step said count is increased as a function of the size of said gap.

16. The invention of claim 15 wherein said sequence character is a number that is advanced by a predetermined numerical increment for said every N messages.

17. The invention of claim 13 comprising the further step performed in said control modem of increasing a count associated with a particular one of said tributary modems whenever a gap occurs in the values of the sequence characters that are in successive messages determined to have originated from that particular modem.

18. The invention of claim 17 wherein said information is a checksum.

19. The invention of claim 17 wherein in said step performed in said control modem said count is increased as a function of the size of said gap.

20. The invention of claim 17 wherein in said step performed in said control modem, a particular message is determined to have originated from said particular modem only if at least the identification and sequence character in that message were correctly recovered by said control modem.

21. The invention of claim 17 wherein each of said messages includes user date supplied to said data communications systems, wherein said identification and said sequence character are transmitted in said each message subsequent to said user data, and wherein said information is a checksum taken over at least said identification, said sequence character and said user data.

22. The invention of claim 21 wherein said sequence character is a sequence number that is advanced by a predetermined numerical increment for said every N messages.

* * * * *